(12) United States Patent
Cadima et al.

(10) Patent No.: US 12,064,053 B2
(45) Date of Patent: Aug. 20, 2024

(54) AUTO SEQUENCING COOKING EVENTS IN AN OVEN APPLIANCE INCLUDING MULTIPLE COOKING CHAMBERS

(71) Applicant: Haier US Appliance Solutions, Inc., Wilmington, DE (US)

(72) Inventors: Paul Bryan Cadima, Crestwood, KY (US); James Lee Armstrong, Louisville, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 40 days.

(21) Appl. No.: 17/501,285

(22) Filed: Oct. 14, 2021

(65) Prior Publication Data

US 2023/0119147 A1    Apr. 20, 2023

(51) Int. Cl.
  *A47J 36/32*    (2006.01)
  *A23L 5/10*    (2016.01)
  *F24C 15/20*    (2006.01)

(52) U.S. Cl.
  CPC .............. *A47J 36/32* (2013.01); *A23L 5/15* (2016.08); *F24C 15/2021* (2013.01)

(58) Field of Classification Search
  None
  See application file for complete search history.

(56) References Cited

U.S. PATENT DOCUMENTS

| | | | |
|---|---|---|---|
| 6,710,308 B2 | 3/2004 | Sauter et al. | |
| 6,756,570 B2 | 6/2004 | Sauter et al. | |
| 9,777,928 B2 | 10/2017 | Boedicker et al. | |
| 10,015,847 B1 | 7/2018 | Lavenziano | |
| 2004/0020917 A1* | 2/2004 | Sauter .................... | F24C 7/087 219/490 |
| 2004/0056015 A1* | 3/2004 | Barritt .................... | F24C 7/087 219/394 |
| 2007/0117058 A1* | 5/2007 | Furuti .................... | F24C 3/128 126/273 R |
| 2016/0324360 A1* | 11/2016 | Boedicker .............. | F24C 7/088 |
| 2019/0086143 A1 | 3/2019 | Liss et al. | |
| 2019/0364618 A1* | 11/2019 | Blum .................. | H05B 1/0266 |

(Continued)

FOREIGN PATENT DOCUMENTS

| | | | | |
|---|---|---|---|---|
| CN | 107752723 A | * | 3/2018 | ............. A47J 27/00 |
| DE | 102008013995 A1 | * | 9/2009 | ................ F24C 7/08 |

OTHER PUBLICATIONS

CN 107752723 A (Yin, Xiao-Xue) Mar. 6, 2018 [retrieved on Mar. 22, 2024]. Retrieved from Foreign Image and Text database, translation by Clarivate Analytics. (Year: 2018).*

(Continued)

*Primary Examiner* — John J Norton
(74) *Attorney, Agent, or Firm* — Dority & Manning, P.A.

(57) ABSTRACT

An oven appliance includes a two or more cooking chambers positioned within a cabinet and a heating assembly for independently and selectively heating those chambers. A controller is configured to obtain a cooking time for each cooking chamber, determine preheat statuses for each chamber, and generate adjusted cooking times for each chamber based at least in part on their respective preheat statuses. The heating assembly then heats each cooking chamber for its adjusted cooking time such that the heating processes in all cooking chambers end simultaneously.

18 Claims, 4 Drawing Sheets

(56) References Cited

U.S. PATENT DOCUMENTS

| | | | |
|---|---|---|---|
| 2020/0033811 A1* | 1/2020 | Helms | G05B 19/042 |
| 2020/0329909 A1* | 10/2020 | Conrad | F24C 7/08 |
| 2021/0186260 A1* | 6/2021 | Bhogal | A47J 36/321 |
| 2022/0046931 A1* | 2/2022 | Iantorno | A47J 36/32 |

OTHER PUBLICATIONS

DE 102008013995 A1 (Greiner, Michael et al.) Sep. 24, 2009 [retrieved on Mar. 23, 2024]. Retrieved from Foreign Image and Text database, translation by Clarivate Analytics. (Year: 2009).*

* cited by examiner

AUTO SEQUENCING COOKING EVENTS IN AN OVEN APPLIANCE INCLUDING MULTIPLE COOKING CHAMBERS

FIELD OF THE INVENTION

The present subject matter relates generally to oven appliances, and more particularly, to methods for operating heating assemblies in an oven appliance including multiple cavities.

BACKGROUND OF THE INVENTION

Conventional residential and commercial oven appliances generally include a cabinet that includes a cooking chamber for receipt of food items for cooking. Multiple gas or electric heating elements are positioned within the cabinet for heating the cooking chamber to cook food items located therein. The heating elements can include, for example, a bake heating assembly positioned at a bottom of the cooking chamber and/or a separate broiler heating assembly positioned at a top of the cooking chamber.

Certain conventional oven appliances include multiple oven cavities with dedicated heating assemblies that are independently operable. However, conventional control algorithms for such heating assemblies lack a coordination of their respective cooking functions. Specifically, when a user is cooking food items that have different cooking recipes or requirements, the user must typically decide when to initiate each specific cooking task and must manually input/start that task at the desired time. Moreover, even though the oven cavities are physically separated, there is commonly some thermal communication among cavities. Accordingly, even if the cooking recipes are properly entered and initiated at the desired times, failure to compensate for preheat conditions or incident heat from other chambers can result in undercooking, overcooking, or other undesirable cooking results.

Accordingly, methods for auto sequencing cooking cycles in multiple chambers of an oven appliance is desirable. More specifically, a cooking method that can cook food items in different chambers and according to different cooking recipes while compensating for preheat conditions of each chamber would be particularly beneficial.

BRIEF DESCRIPTION OF THE INVENTION

Aspects and advantages of the invention will be set forth in part in the following description, or may be apparent from the description, or may be learned through practice of the invention.

In one exemplary embodiment, an oven appliance defining a vertical, a lateral, and a transverse direction is provided. The oven appliance includes a cabinet, a first cooking chamber and a second cooking chamber positioned within the cabinet, and a heating assembly for independently and selectively heating the first cooking chamber and the second cooking chamber. A controller is operably coupled to the heating assembly and is configured to obtain a first cooking time for the first cooking chamber and a second cooking time for the second cooking chamber, determine a first preheat status for the first cooking chamber and a second preheat status for the second cooking chamber, generate a first adjusted cooking time based at least in part on the first cooking time and the first preheat status and a second adjusted cooking time based at least in part on the second cooking time and the second preheat status, and operate the heating assembly to heat the first cooking chamber for the first adjusted cooking time and the second cooking chamber for the second adjusted cooking time such that the first adjusted cooking time and the second adjusted cooking time end simultaneously.

In another exemplary embodiment, a method of operating an oven appliance is provided. The oven appliance includes a first chamber, a second chamber, and a heating assembly for independently and selectively heating the first cooking chamber and the second cooking chamber. The method includes obtaining a first cooking time for the first cooking chamber and a second cooking time for the second cooking chamber, determining a first preheat status for the first cooking chamber and a second preheat status for the second cooking chamber, generating a first adjusted cooking time based at least in part on the first cooking time and the first preheat status and a second adjusted cooking time based at least in part on the second cooking time and the second preheat status, and operating the heating assembly to heat the first cooking chamber for the first adjusted cooking time and the second cooking chamber for the second adjusted cooking time such that the first adjusted cooking time and the second adjusted cooking time end simultaneously.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

Figure 1:
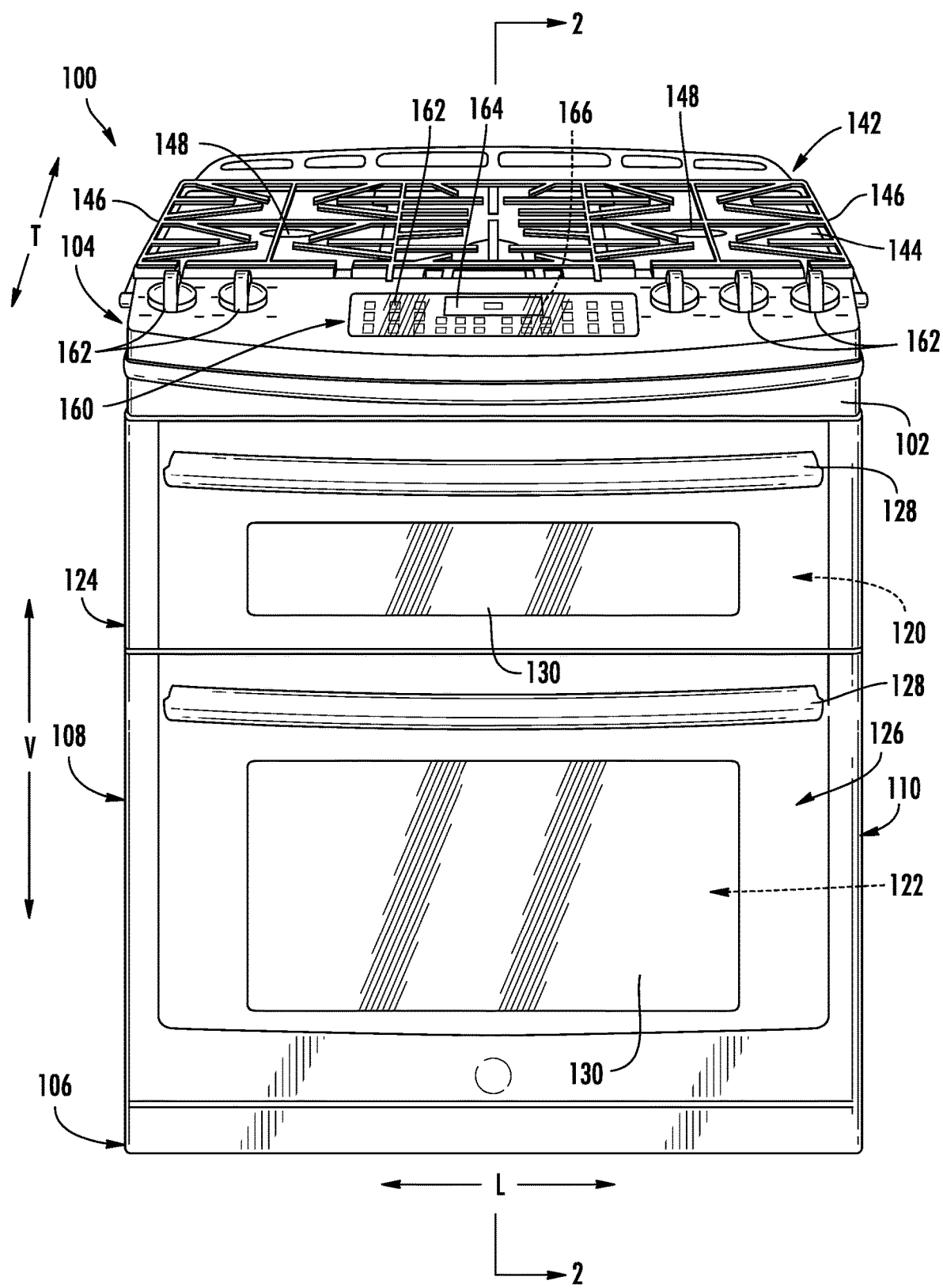
FIG. 1 is a front, perspective view of an oven appliance according to an exemplary embodiment of the present subject matter.

Repeat use of reference characters in the present specification and drawings is intended to represent the same or analogous features or elements of the present invention.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first," "second," and "third" may be used interchangeably to distinguish one component from another and are not intended to signify location or importance of the individual components. The terms "includes" and "including" are intended to be inclusive in a manner similar to the term "comprising." Similarly, the term "or" is generally intended to be inclusive (i.e., "A or B" is intended to mean "A or B or both"). In addition, here and throughout the specification and claims, range limitations may be combined and/or interchanged. Such ranges are identified and include all the sub-ranges contained therein unless context or language indicates otherwise. For example, all ranges disclosed herein are inclusive of the endpoints, and the endpoints are independently combinable with each other. The singular forms "a," "an," and "the" include plural references unless the context clearly dictates otherwise.

Approximating language, as used herein throughout the specification and claims, may be applied to modify any quantitative representation that could permissibly vary without resulting in a change in the basic function to which it is related. Accordingly, a value modified by a term or terms, such as "generally," "about," "approximately," and "substantially," are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 10 percent margin, i.e., including values within ten percent greater or less than the stated value. In this regard, for example, when used in the context of an angle or direction, such terms include within ten degrees greater or less than the stated angle or direction, e.g., "generally vertical" includes forming an angle of up to ten degrees in any direction, e.g., clockwise or counterclockwise, with the vertical direction V.

The word "exemplary" is used herein to mean "serving as an example, instance, or illustration." In addition, references to "an embodiment" or "one embodiment" does not necessarily refer to the same embodiment, although it may. Any implementation described herein as "exemplary" or "an embodiment" is not necessarily to be construed as preferred or advantageous over other implementations. Moreover, each example is provided by way of explanation of the invention, not limitation of the invention. In fact, it will be apparent to those skilled in the art that various modifications and variations can be made in the present invention without departing from the scope of the invention. For instance, features illustrated or described as part of one embodiment can be used with another embodiment to yield a still further embodiment. Thus, it is intended that the present invention covers such modifications and variations as come within the scope of the appended claims and their equivalents.

FIG. 1 provides a front, perspective view of an oven appliance 100 as may be employed with the present subject matter. Oven appliance 100 generally defines a vertical direction V, a lateral direction L, and a transverse direction T, each of which is mutually perpendicular, such that an orthogonal coordinate system is generally defined. As illustrated, oven appliance 100 includes an insulated cabinet 102. Cabinet 102 of oven appliance 100 extends between a top 104 and a bottom 106 along the vertical direction V, between a first side 108 (left side when viewed from front) and a second side 110 (right side when viewed from front) along the lateral direction L, and between a front 112 and a rear 114 along the transverse direction T.

Within cabinet 102 is an upper cooking chamber 120 and a lower cooking chamber 122 configured for the receipt of one or more food items to be cooked. Thus, oven appliance 100 is generally referred to as a double oven range appliance. However, as will be understood by those skilled in the art, oven appliance 100 is provided by way of example only, and the present subject matter may be used in any suitable cooking appliance. Thus, the present subject matter may be used with other oven appliances such as wall ovens, electric ovens, gas ovens, microwave ovens, etc. In addition, the example embodiment shown in FIG. 1 is not intended to limit the present subject matter to any particular cooking chamber configuration or arrangement.

Oven appliance 100 includes an upper door 124 and a lower door 126 rotatably attached to cabinet 102 in order to permit selective access to upper cooking chamber 120 and lower cooking chamber 122, respectively. Handles 128 are mounted to upper and lower doors 124 and 126 to assist a user with opening and closing doors 124 and 126 in order to access cooking chambers 120 and 122. As an example, a user can pull on handle 128 mounted to upper door 124 to open or close upper door 124 and access upper cooking chamber 120. Doors 124, 126 may include windows 130, constructed for example from multiple parallel glass panes to provide for viewing the contents of and insulating the insulated cooking chambers 120, 122.

As illustrated, each of insulated cooking chambers 120, 122 are defined by a plurality of chamber walls, identified generally herein by reference numeral 132. For example, insulated cooking chambers 120, 122 each include a top wall 134 and a bottom wall 136 which are spaced apart along the vertical direction V. A left sidewall and a right sidewall extend between the top wall 134 and bottom wall 136, and are spaced apart along the lateral direction L. A rear wall 138 may additionally extend between the top wall 134 and the bottom wall 136 as well as between the left sidewall and the right sidewall, and is spaced apart from doors 124, 126 along the transverse direction T. In this manner, when doors 124, 126 are in the closed position, cooking cavities are defined, and a front opening 140 is defined for each cooking chamber 120, 122, e.g., proximate front 112 of oven appliance 100.

Referring to FIG. 1, oven appliance 100 also includes a cooktop 142. Cooktop 142 is positioned at or adjacent top 104 of cabinet 102. Thus, cooktop 142 is positioned above upper cooking chamber 120 and includes a top panel 144 positioned proximate top 104 of cabinet 102. By way of example, top panel 144 may be constructed of glass, ceramics, enameled steel, and combinations thereof. One or more grates 146 are supported on a top surface of top panel 144 for supporting cooking utensils, such as pots or pans, during a cooking process. As shown in FIG. 1, oven appliance 100 may include a plurality of burners assemblies 148 mounted within or on top of top panel 144 underneath grates 146, and such burner assemblies 148 can be configured in various sizes so as to provide e.g., for the receipt of cooking utensils (i.e., pots, pans, etc.) of various sizes and configurations and to provide different heat inputs for such cooking utensils.

Figure 2:
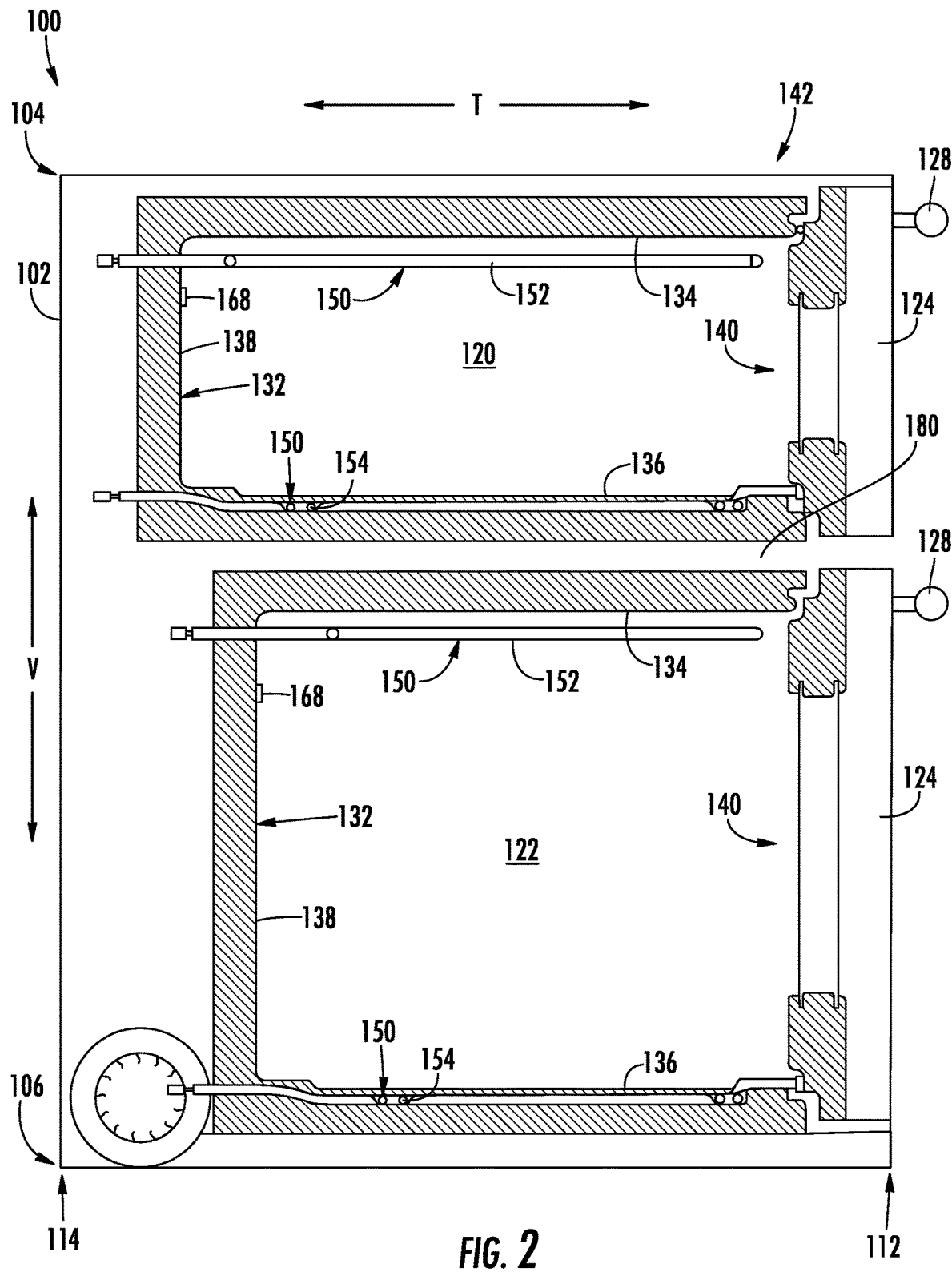
FIG. 2 is a cross sectional view of the exemplary oven appliance of FIG. 1, taken along Line 2-2 in FIG. 1.

Referring now specifically to FIG. 2, oven appliance 100 may include various heating elements 150, such as electric resistance heating elements, gas burners, microwave heating elements, halogen heating elements, electric tubular heaters (e.g., such as Calrod® heaters), or suitable combinations thereof. Heating elements 150 are positioned in thermal communication with upper cooking chamber 120 and lower cooking chamber 122 for heating upper cooking chamber 120 and lower cooking chamber 122.

Specifically, an upper heating element 152 (also referred to as a broil heating element, electric burner, or gas burner) may be positioned in cabinet 102, e.g., at a top portion of cooking chambers 120, 122, and a lower heating element 154 (also referred to as a bake heating element, electric burner, or gas burner) may be positioned proximate a bottom portion of cooking chambers 120, 122. Upper heating element 152 and lower heating element 154 may be used independently or simultaneously to heat cooking chambers 120, 122, perform a baking or broil operation, perform a cleaning cycle, etc. The size and heat output of heating elements 152, 154 can be selected based on, e.g., the size of oven appliance 100 or the desired heat output. Oven appliance 100 may include any other suitable number, type, and configuration of heating elements 150 within cabinet 102 and/or on cooktop 142. For example, oven appliance 100 may further include electric heating elements, induction heating elements, or any other suitable heat generating device.

One or more baking racks (not shown) may be positioned in insulated cooking chambers 120, 122 for the receipt of food items or utensils containing food items. The baking racks may be slidably received onto embossed ribs or sliding rails such that the baking racks may be conveniently moved into and out of insulated cooking chamber 120, 122 when doors 124, 126 are open.

A user interface panel 160 is located within convenient reach of a user of the oven appliance 100. For this example embodiment, user interface panel 160 includes knobs 162 that are each associated with one of heating elements 150. In this manner, knobs 162 allow the user to activate each heating element 150 and determine the amount of heat input provided by each heating element 150 to a cooking food items within cooking chambers 120, 122 or on cooktop 142. Although shown with knobs 162, it should be understood that knobs 162 and the configuration of oven appliance 100 shown in FIG. 1 is provided by way of example only. More specifically, user interface panel 160 may include various input components, such as one or more of a variety of touch-type controls, electrical, mechanical or electro-mechanical input devices including rotary dials, push buttons, and touch pads. User interface panel 160 may also be provided with one or more graphical display devices or display components 164, such as a digital or analog display device designed to provide operational feedback or other information to the user such as e.g., whether a particular heating element 150 is activated and/or the rate at which the heating element 150 is set.

Generally, oven appliance 100 may include a controller 166 in operative communication with user interface panel 160. User interface panel 160 of oven appliance 100 may be in communication with controller 166 via, for example, one or more signal lines or shared communication busses, and signals generated in controller 166 operate oven appliance 100 in response to user input via user input devices 162. Input/Output ("I/O") signals may be routed between controller 166 and various operational components of oven appliance 100 such that operation of oven appliance 100 can be regulated by controller 166. In addition, controller 166 may also be communication with one or more sensors, such as temperature sensor 168 (FIG. 2), which may be used to measure temperature inside cooking chamber 120, 122 and provide such measurements to the controller 166. Although temperature sensor 168 is illustrated at a top and rear of cooking chambers 120, 122, it should be appreciated that other sensor types, positions, and configurations may be used according to alternative embodiments.

As used herein, "temperature sensor" or the equivalent is intended to refer to any suitable type of temperature measuring system or device positioned at any suitable location for measuring the desired temperature. Thus, for example, temperature sensors 168 may each be any suitable type of temperature sensor, such as a thermistor, a thermocouple, a resistance temperature detector, a semiconductor-based integrated circuit temperature sensor, etc. In addition, temperature sensors 168 may be positioned at any suitable location and may output a signal, such as a voltage, to a controller that is proportional to and/or indicative of the temperature being measured. Although exemplary positioning of temperature sensors is described herein, it should be appreciated that oven appliance 100 may include any other suitable number, type, and position of temperature sensors according to alternative embodiments.

As explained above, oven appliance 100 may generally define upper cooking chamber 120 and lower cooking chamber 122 that are each configured for receiving food items to be cooked. In this regard, oven appliance 100 includes a partition 180 that defines bottom wall 136 of upper cooking chamber 120 and top wall 134 of lower cooking chamber 122. Each cooking chamber 120, 122 may include a heating assembly 204 for independently and selectively heating that respective cooking chamber 120, 122. According to exemplary embodiments, partition 180 provides substantial thermal isolation between upper cooking chamber 120 and lower cooking chamber 122 (though some thermal leakage may still exist in some embodiments). In general, temperature sensors 168 may be in operative communication with controller 166 to facilitate a closed-loop cooking process to regulate chamber temperatures. In this regard, as would be understood by one having ordinary skill in the art, a closed-loop cooking process generally refers to a heating operation that relies on temperature feedback from one or more temperature sensors.

Controller 166 is a "processing device" or "controller" and may be embodied as described herein. Controller 166 may include a memory and one or more microprocessors, microcontrollers, application-specific integrated circuits (ASICS), CPUs or the like, such as general or special purpose microprocessors operable to execute programming instructions or micro-control code associated with operation of oven appliance 100, and controller 166 is not restricted necessarily to a single element. The memory may represent random access memory such as DRAM, or read only memory such as ROM, electrically erasable, programmable read only memory (EEPROM), or FLASH. In one embodiment, the processor executes programming instructions stored in memory. The memory may be a separate component from the processor or may be included onboard within the processor. Alternatively, controller 166 may be constructed without using a microprocessor, e.g., using a combination of discrete analog and/or digital logic circuitry (such as switches, amplifiers, integrators, comparators, flip-flops, AND gates, and the like) to perform control functionality instead of relying upon software.

Although aspects of the present subject matter are described herein in the context of a double oven appliance including a cooktop, it should be appreciated that oven appliance 100 is provided by way of example only. In this regard, the present subject matter is not limited to any particular style, model, or configuration of oven appliance 100. For example, other oven or range appliances having different configurations, different appearances, and/or different features may also be utilized with the present subject matter as well.

Now that the construction of oven appliance 100 according to exemplary embodiments has been presented, an exemplary method 200 of operating an oven appliance 100 will be described. Although the discussion below refers to the exemplary method 200 of operating oven appliance 100, one skilled in the art will appreciate that the exemplary method 200 is applicable to the operation of a variety of other oven appliances. In exemplary embodiments, the various method steps as disclosed herein may be performed by a controller 166 of oven appliance 100 or a separate, dedicated controller.

Figure 3:
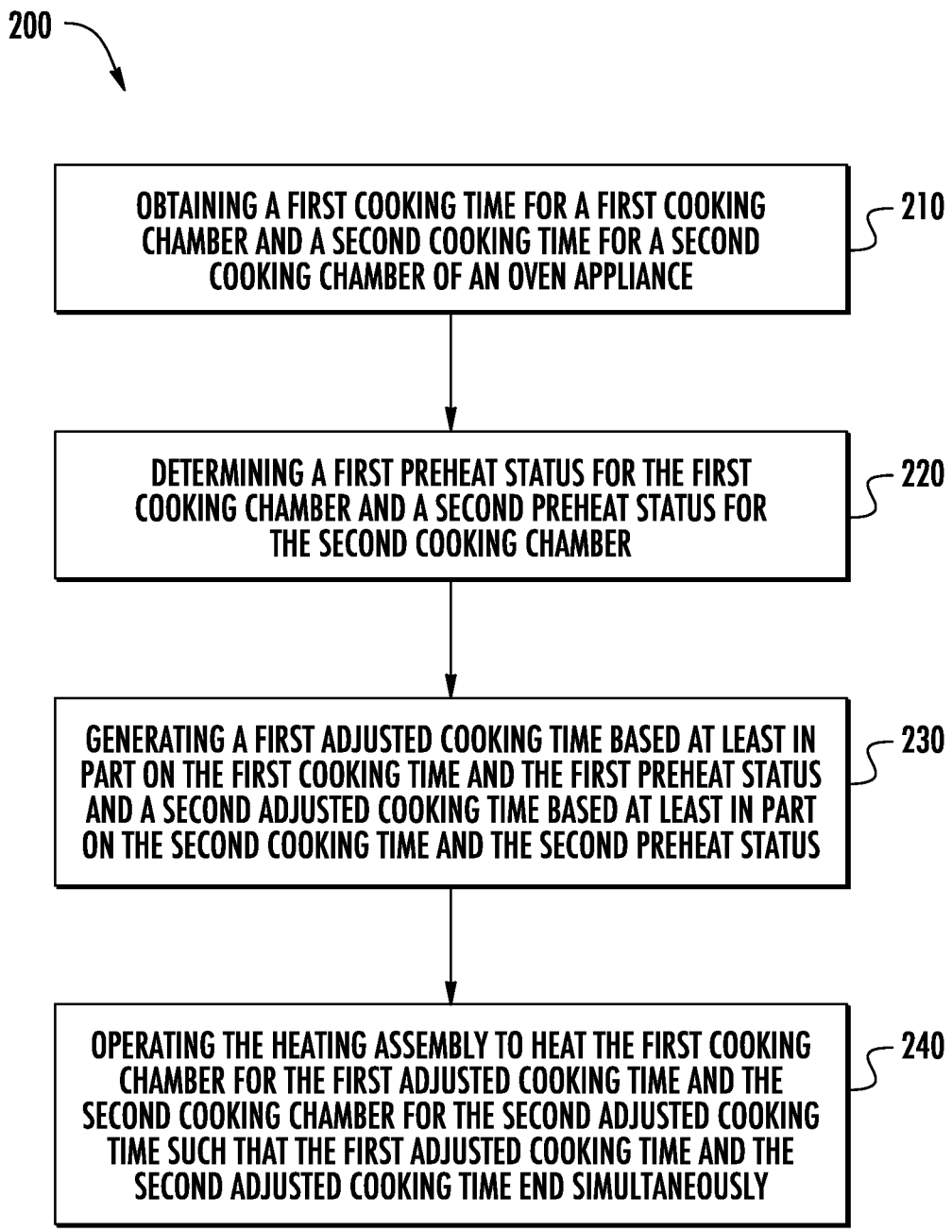
FIG. 3 provides a method for operating an oven appliance according to an exemplary embodiment of the present subject matter.
Figure 4:
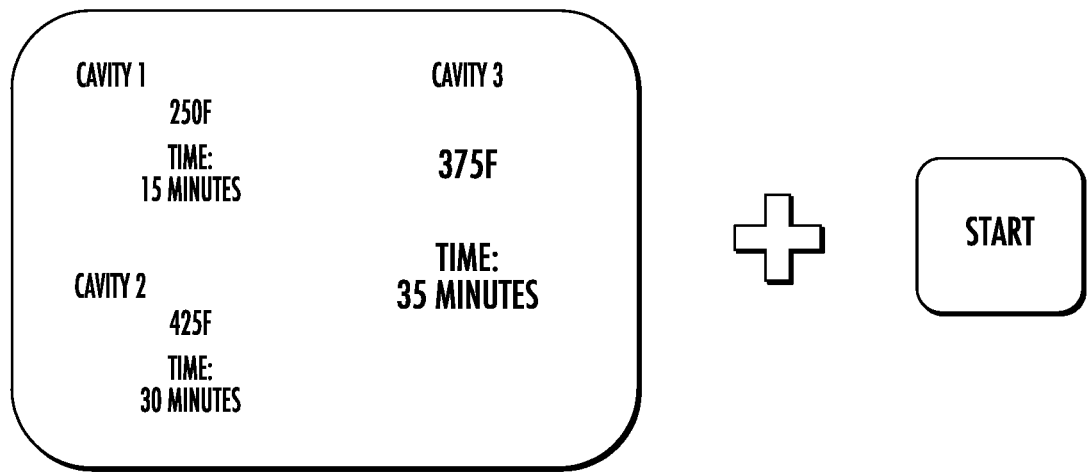
FIG. 4 provides a schematic view of control inputs by a user to initiate an auto sequenced cooking cycle in three cooking chambers according to an exemplary embodiment of the present subject matter.

Referring now to FIG. 3, method 200 includes, at step 210, obtaining a first cooking time for a first cooking chamber and a second cooking time for a second cooking chamber of an oven appliance. For example, referring now briefly to FIG. 4, a schematic diagram showing the user input of a cooking recipe utilizing three cooking chambers in an oven is illustrated. In this regard, as shown, the user may be prompted by the user interface panel to select each chamber and specify the target cooking time and the target cooking temperature. The user may then press start to initiate the auto sequenced cooking cycle in each of the three chambers. In describing method 200 herein, the present disclosure refers to controlling only two cooking chambers, but it should be appreciated that the present methods may apply to the control of any suitable number of cooking chambers (e.g., as shown in FIGS. 4 and 5 for three cooking chambers).

Continuing the example utilizing two cooking chambers, the first cooking time may generally refer to the time period that upper cooking chamber 120 should be maintained at a first target cooking temperature, e.g., to facilitate cooking of a food item placed within upper cooking chamber 120. Similarly, the second cooking time may generally refer to the time period that lower cooking chamber 122 should be maintained at a second target cooking temperature, e.g., to facilitate cooking of another food item placed within lower cooking chamber 122. For example, if a user is cooking lasagna in upper cooking chamber 120 and biscuits and lower cooking chamber 122, the first cooking time may be 40 minutes and the first target cooking temperature may be 375° F., while the second cooking time may be 12 minutes and the second target cooking temperature may be 400° F.

Figure 5:
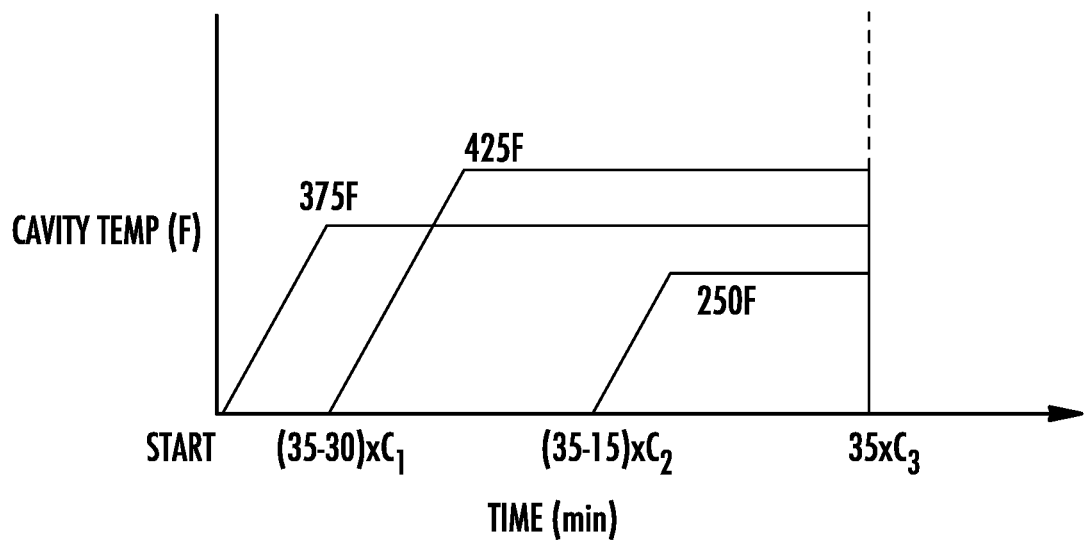
FIG. 5 is a plot of the cavity temperatures over time during an auto sequenced cooking cycle in three cooking chambers according to exemplary embodiments of the present subject matter.

Referring now briefly to FIG. 5, a plot of the cavity temperatures over time during an auto sequenced cooking cycle in three cooking chambers is provided. The target cooking times, similar to those obtained in step 210, are identified herein generally by the horizontal lines shown in FIG. 5, i.e., 250° F. for cavity 1, 425° F. for cavity 2, and 375° F. for cavity 3.

As explained herein, it may be desirable to operate a heating assembly of oven appliance 100 such that the food items cooked in both upper cooking chamber 120 and lower cooking chamber 122 are cooked to the precise doneness level and finish cooking at the same time (e.g., indicated by the vertical dotted line in FIG. 5). Notably, conventional methods for operating an oven appliance with multiple cavities fail to compensate for a variety of factors which may affect the finish time and/or the doneness level. For example, conventional algorithms fail to compensate for the preheat status or starting temperature of each respective cooking chamber. In addition, conventional algorithms fail to compensate for heat transfer between adjacent chambers. Conventional algorithms also fail to compensate for the magnitude of temperature difference between the starting temperature and the target temperature. Accordingly, aspects of the present subject matter are directed to improved methods of operation to cure one or more of the above deficiencies.

For example, steps 220 through 240 (described below) are generally intended to facilitate operation of oven appliance 100 in a manner that compensates for preheat status of each respective chamber. However, as explained herein, similar methodologies may be used compensate for other parameters or conditions which affect the cooking process within oven appliance 100. Exemplary parameters are described herein, it should be appreciated that the present subject matter is not limited to the examples described.

Step 220 generally includes determining a first preheat status for the first cooking chamber and a second preheat status for the second cooking chamber. In general, the term "preheat status" is intended to refer to the amount of thermal energy stored within a respective cooking chamber or otherwise correspond to the temperature of the cooking chamber or the amount of time necessary to reach the target cooking temperature. Controller 166 of oven appliance 100 may determine the preheat status in any suitable manner. For example, the preheat status may be determined based on the operational history of heating assemblies within oven appliance, based on measured temperatures of each cooking chamber, or in any other suitable manner.

For example, according to an exemplary embodiment, oven appliance 100 may use temperature sensors (e.g., such as temperature sensors 168) to measure the chamber temperature and may estimate a preheat status based on those measured temperatures. Specifically, controller 166 may use a first temperature sensor (e.g., temperature sensor 168 in upper cooking chamber 120) to measure a first starting temperature of upper cooking chamber 120 and may use a second temperature sensor (e.g., temperature sensor 168 in lower cooking chamber 122) to measure a second starting temperature of lower cooking chamber 122. In general, these "starting temperatures" are generally intended to refer to the temperature of air within the cooking chamber at the commencement of an operating cycle or upon the user pressing a start button to initiate appliance operation.

According to exemplary embodiments, the preheat status may be determined based on comparison of the chamber starting temperatures with predetermined preheat threshold temperatures. In this regard, for example, controller 166 may be programmed with predetermined preheat thresholds (e.g., 50° F., 100° F., 150° F., 200° F., 250° F., 300° F. etc.). For example, if the starting chamber temperature is below the preheat threshold, the chamber may be deemed not preheated. By contrast, if the starting chamber temperature is above the preheat threshold, the chamber may be considered preheated. Although the preheat status is described herein as being preheated or not, it should be appreciated that the preheated status may further refer to any other quantification or measure of preheat. For example, the preheat status may generally refer to a temperature difference between the target cooking temperature and starting temperature.

Step 230 generally includes generating a first adjusted cooking time based at least in part on the first cooking time and the first preheat status and a second adjusted cooking time based at least in part on the second cooking time and the second preheat status. In this regard, the cooking times input by the user of oven appliance 100 may be compensated for preheat status, e.g., to ensure more accurate cooking and to ensure that the cooking cycle in each respective chamber may be commenced at the desired start time to ensure that all cooking cycles end at the exact same time. Specifically, in this regard, step 240 may include operating the heating assembly of the oven appliance to heat the first cooking chamber for the first adjusted cooking time and the second cooking chamber for the second adjusted cooking time such that the first adjusted cooking time and the second adjusted cooking time end simultaneously (e.g., as shown in FIG. 5).

Although method 200 is described herein as being used to compensate for preheat status within two cooking chambers (e.g., upper cooking chamber 120 and lower cooking chamber 122), it should be appreciated that aspects of the present method may be applied to additional cooking chambers and to additional compensating factors. For example, according to an exemplary embodiment, oven appliance may further include a third cooking chamber and the controller may be configured to obtain a third cooking time for the third cooking chamber, determine a third preheat status for the third cooking chamber, generate a third adjusted cooking time based at least in part on the third cooking time and the third preheat status, and operate the heating assembly to heat the third cooking chamber for the third adjusted cooking time such that the first adjusted cooking time, the second adjusted cooking time, and the third adjusted cooking time end simultaneously.

Exemplary methods of generating the adjusted cooking times will now be described according to exemplary embodiments. For example, according to an exemplary embodiment, generating the first adjusted cooking time and the second adjusted cooking time may include determining cooking time modifiers (e.g., identified generally by constants $C_1$, $C_2$, and $C_3$ in FIG. 5) that are used to adjust the first and second cooking times to the adjusted cooking times. While the cooking time modifiers may, according to exemplary embodiments, reduce the input cooking times, these cooking time modifiers are generally intended to increase the input cooking times, e.g., to compensate for lack of preheat. However, aspects of the present subject matter are directed to improved methods for more accurately extending the cooking times or generating the adjusted cooking times based on a more comprehensive set of data associated with specific appliance conditions and historical performance.

For example, according to exemplary embodiments, the cooking time modifiers may be multiplied by the input cooking times to generate the adjusted cooking time. Thus, method 200 may include determining a first cooking time modifier based at least in part on the first preheat status and a second cooking time modifier based at least in part in the second preheat status. Method 200 may further include multiplying the first cooking time by the first cooking time modifier and the second cooking time by the second cooking time modifier to generate the adjusted cooking times. If a cooking chamber is fully preheated and there are no other compensating factors, the cooking time modifier may be 1 (e.g., such that the adjusted cooking time is equivalent to the input cooking time). By contrast, if a larger preheat time is needed the cooking time modifier may be greater. In general, the cooking time modifiers may be between about 1 and 2, between about 1.05 and 1.5, between about 1.1 and 1.3, about 1.2, or any other suitable ratio therebetween.

Moreover, it should be appreciated that according to exemplary embodiments, the cooking time modifiers may be based on parameters or conditions other than the preheat status. For example, according to exemplary embodiments, the first cooking time and the second cooking time are part of a cooking recipe that is input by a user of oven appliance 100. For example, this cooking recipe may include a full list of operational parameters for oven appliance 100 with respect to each cooking chamber. These cooking recipes may include at least one of a cooking mode, a cooking time, a cooking temperature, historical operating characteristics of a particular chamber, or any other suitable parameters. For example, if the empirical data shows that a particular chamber has historically heated slower than other chambers, the cooking time modifier may be increased for that particular chamber. The cooking time modifier may be based on any or all of these parameters.

For example, determining the first adjusted cooking time and second adjusted the cooking time may include determining a first cooking time modifier based at least in part on the first target temperature (e.g., the target cooking temperature of upper chamber 120) and a second cooking time modifier based at least in part on the second target temperature (e.g., the target cooking temperature of lower chamber 122). More specifically, according to exemplary embodiments, method 200 may include determining that the first preheat status includes a first starting temperature and the cooking time modifiers are based on a difference between the first starting temperature in the first target temperature. Similarly, the second pre-status may include a second target temperature and the second cooking time modifier may be based on the difference between the second starting temperature and the second target temperature. Moreover, the cooking time modifier may generally have a proportional relationship with the difference between the starting temperature and the target temperature for that respective chamber. Accordingly, if the starting temperature is 70° F. and the target temperature is 400° F. (i.e., a 330° F. difference), the cooking time modifier may be larger than if the starting temperature is 200° F. and the target temperature is 400° F. (i.e., 200° F. difference).

According to other exemplary embodiments, generating the adjusted cooking times may include determining that the cooking time modifiers have an inverse relationship with the target cooking times. In this regard, for example, if a food item in upper chamber 120 is intended to cook for two hours and a food item in lower chamber 122 is intended to cook for 12 minutes, the cooking time modifier for upper chamber 120 may be much less than the cooking time modifier for lower chamber 122. In this regard, it is presumed that given the much longer cook time within upper chamber 120 that the additional preheat time achieved by a larger cooking time modifier would have negligible effect on the cooking process. By contrast, for the item that will be cooked much quicker in lower chamber 122, a larger cooking time modifier may be used to ensure that the temperature within lower chamber 122 reaches suitable temperature for the desired amount of time.

In addition, as explained briefly above, the cooking time modifiers may be based at least in part on the selected cooking mode, operating characteristics of an oven appliance, or any other suitable parameters. In this regard, empirical data associated with appliance operation or with the operation of similar appliances may be used to determine useful information that may be used to calculate appropriate cooking time modifiers. For example, if a chamber position or thermal insulation characteristics affect the preheat time associated with a particular chamber reaching a target temperature, the cooking time modifier for that chamber may be modified accordingly.

In addition, cooking time modifiers may be used to compensate for thermal communication between cooking chambers within the same appliance. For example, as explained above, oven appliance 100 may generally include a partition 180 that separates upper cooking chamber 120 from lower cooking chamber 122. However, while partition 180 provides at least partial thermal isolation between the chambers, it is possible that there is still some heat transfer therebetween. Accordingly, the cooking time modifiers may be varied based on the heating status or temperatures of adjacent chambers. For example, the cooking time modifier for one chamber may have an inverse relationship with a temperature of an adjacent chamber. More specifically, if upper chamber 120 is operating on broil mode at 500° F., the cooking time modifier may be decreased slightly for lower chamber 122 relative to a condition where upper chamber 120 is operating on bake mode at 200° F. In this manner, the cooking time modifier is lower to compensate for the potential heat transfer from upper chamber 120 to lower chamber 122.

FIG. 3 depicts steps performed in a particular order for purposes of illustration and discussion. Those of ordinary skill in the art, using the disclosures provided herein, will understand that the steps of any of the methods discussed herein can be adapted, rearranged, expanded, omitted, or modified in various ways without deviating from the scope of the present disclosure. Moreover, although aspects of method 200 is explained using oven appliance 100 as an example, it should be appreciated that this method may be applied to the operation of any suitable oven appliance.

Aspects of the present subject matter are generally directed to methods for auto sequencing cooking events in an oven appliance having multiple cavities. For example, a user interface may prompt a user to enter cooking recipes (e.g., including cooking mode, time, and temperature) for each of the multiple cavities prior to initiating the auto sequenced cooking cycle. The method may include automatically sequencing the operation of heating assemblies in the cavities to automatically implement the recipes, compensate for preheat conditions in each chamber, and ensure that the cooking of each of the food items is completed at the same time.

Specifically, according to an exemplary embodiment, a user may press a button to activate an auto sequence cooking mode. The user interface may display a visual schematic of the cooking chambers and the user may select and manipulate each cooking chamber and its corresponding cooking recipe. The user may then press start and the appliance would initiate the longest cooking recipe/chamber first. A time delay may be provided to the shorter time cooking recipes of other cavities included in the automatic sequencing feature, such that the end time of each recipe for each cavity is the same.

Moreover, the cooking time of all cavities may be modified to offset or compensate for any effects from a cold cavity start. In this regard, for example, the appliance may measure a chamber temperature or otherwise detect whether each cooking chamber is preheated, and the cooking recipes may be modified to compensate for such preheat status. Specifically, the appliance can modify the user input time of the cooking recipe based on the cold start condition for that cavity. Each cavity can have its own modifier (e.g., modifying coefficient) or they may be shared. The coefficients may be constant or a function of combination of recipe temperature, mode, cavity, and time. These modifications may be determined prior to the initiation of cooking process.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. An oven appliance defining a vertical, a lateral, and a transverse direction, the oven appliance comprising:
    a cabinet;
    a first cooking chamber and a second cooking chamber positioned within the cabinet;
    a heating assembly for independently and selectively heating the first cooking chamber and the second cooking chamber; and
    a controller operably coupled to the heating assembly, the controller being configured to:
        obtain a first cooking time for the first cooking chamber and a second cooking time for the second cooking chamber;
        determine a first preheat status for the first cooking chamber and a second preheat status for the second cooking chamber, wherein the first preheat status may be determined based on a first historical heating rate experienced by the first cooking chamber and the second preheat status may be determined based on a second historical heating rate experienced by the second cooking chamber;
        generate a first adjusted cooking time based at least in part on the first cooking time and the first preheat status and a second adjusted cooking time based at least in part on the second cooking time and the second preheat status; and
        operate the heating assembly to heat the first cooking chamber for the first adjusted cooking time and the second cooking chamber for the second adjusted cooking time such that the first adjusted cooking time and the second adjusted cooking time end simultaneously.

2. The oven appliance of claim 1, further comprising a first temperature sensor positioned within the first cooking chamber and a second temperature sensor positioned within the second cooking chamber, wherein determining the first preheat status and the second preheat status comprises:
    obtaining a first starting temperature using the first temperature sensor and a second starting temperature using the second temperature sensor; and
    comparing the first starting temperature with a first predetermined preheat threshold temperature and the second starting temperature with a second predetermined preheat threshold temperature.

3. The oven appliance of claim 1, wherein generating the first adjusted cooking time and the second adjusted cooking time comprises:
    determining a first cooking time modifier based at least in part on the first preheat status and a second cooking time modifier based at least in part on the second preheat status; and
    multiplying the first cooking time by the first cooking time modifier and the second cooking time by the second cooking time modifier.

4. The oven appliance of claim 3, wherein the first cooking time modifier and the second cooking time modifier are between about 1 and 1.5.

5. The oven appliance of claim 1, further comprising:
    a user interface panel for receiving a user input including a first cooking recipe and a second cooking recipe, wherein the first cooking recipe includes at least one of a first cooking mode, the first cooking time, and a first target temperature, and wherein the second cooking recipe includes at least one of a second cooking mode, the second cooking time, and a second target temperature.

6. The oven appliance of claim 5, wherein generating the first adjusted cooking time and the second adjusted cooking time comprises:
   determining a first cooking time modifier based at least in part on the first target temperature and a second cooking time modifier based at least in part on the second target temperature; and
   multiplying the first cooking time by the first cooking time modifier and the second cooking time by the second cooking time modifier.

7. The oven appliance of claim 6, wherein the first preheat status comprises a first starting temperature of the first cooking chamber and the first cooking time modifier is based on a difference between the first starting temperature and the first target temperature, and wherein the second preheat status comprises a second starting temperature of the second cooking chamber and the second cooking time modifier is based on a difference between the second starting temperature and the second target temperature.

8. The oven appliance of claim 7, wherein the first cooking time modifier has a proportional relationship with the difference between the first starting temperature and the first target temperature and the second cooking time modifier has a proportional relationship with the difference between the second starting temperature and the second target temperature.

9. The oven appliance of claim 1, wherein generating the first adjusted cooking time based at least in part on the first cooking time and the first preheat status and the second adjusted cooking time based at least in part on the second cooking time and the second preheat status comprises:
   determining a first cooking time modifier that has an inverse relationship with the first cooking time and a second cooking time modifier that has an inverse relationship with the second cooking time; and
   multiplying the first cooking time by the first cooking time modifier and the second cooking time by the second cooking time modifier.

10. The oven appliance of claim 1, wherein generating the first adjusted cooking time based at least in part on the first cooking time and the first preheat status and the second adjusted cooking time based at least in part on the second cooking time and the second preheat status comprises:
    determining a first cooking time modifier and a second cooking time modifier, wherein the first cooking time modifier and the second cooking time modifier are based at least in part on a cooking mode or operating characteristics of the first cooking chamber and the second cooking chamber, respectively; and
    multiplying the first cooking time by the first cooking time modifier and the second cooking time by the second cooking time modifier.

11. The oven appliance of claim 1, wherein the first cooking chamber is in thermal communication with the second cooking chamber, and wherein generating the first adjusted cooking time based at least in part on the first cooking time and the first preheat status and the second adjusted cooking time based at least in part on the second cooking time and the second preheat status comprises:
    determining a first cooking time modifier and a second cooking time modifier to compensate for thermal communication between the first cooking chamber and the second cooking chamber; and
    multiplying the first cooking time by the first cooking time modifier and the second cooking time by the second cooking time modifier.

12. The oven appliance of claim 11, wherein the first cooking time modifier has an inverse relationship with a temperature of the second cooking chamber and the second cooking time modifier has an inverse relationship with a temperature of the first cooking chamber.

13. The oven appliance of claim 1, further comprising:
    a partition that physically separates the first cooking chamber and the second cooking chamber to provide at least partial thermal isolation between the first cooking chamber and the second cooking chamber.

14. The oven appliance of claim 1, wherein the heating assembly comprises:
    a first heating assembly positioned in thermal communication with the first cooking chamber for selectively heating the first cooking chamber; and
    a second heating assembly positioned in thermal communication with the second cooking chamber for selectively heating the second cooking chamber.

15. A method of operating an oven appliance, the oven appliance comprising a first chamber, a second chamber, and a heating assembly for independently and selectively heating the first cooking chamber and the second cooking chamber, the method comprising:
    obtaining a first cooking time for the first cooking chamber and a second cooking time for the second cooking chamber;
    determining a first preheat status for the first cooking chamber and a second preheat status for the second cooking chamber, wherein the first preheat status may be determined based on a first historical heating rate experienced by the first cooking chamber and the second preheat status may be determined based on a second historical heating rate experienced by the second cooking chamber;
    generating a first adjusted cooking time based at least in part on the first cooking time and the first preheat status and a second adjusted cooking time based at least in part on the second cooking time and the second preheat status; and
    operating the heating assembly to heat the first cooking chamber for the first adjusted cooking time and the second cooking chamber for the second adjusted cooking time such that the first adjusted cooking time and the second adjusted cooking time end simultaneously.

16. The method of claim 15, wherein the oven appliance further comprises a first temperature sensor positioned within the first cooking chamber and a second temperature sensor positioned within the second cooking chamber, wherein determining the first preheat status and the second preheat status comprises:
    obtaining a first starting temperature using the first temperature sensor and a second starting temperature using the second temperature sensor; and
    comparing the first starting temperature with a first predetermined preheat threshold temperature and the second starting temperature with a second predetermined preheat threshold temperature.

17. The method of claim 15, wherein generating the first adjusted cooking time and the second adjusted cooking time comprises:

determining a first cooking time modifier based at least in part on the first preheat status and a second cooking time modifier based at least in part on the second preheat status; and multiplying the first cooking time by the first cooking time modifier and the second cooking time by the second cooking time modifier.

18. The method of claim 15, wherein generating the first adjusted cooking time based at least in part on the first cooking time and the first preheat status and the second adjusted cooking time based at least in part on the second cooking time and the second preheat status comprises:

determining a first cooking time modifier and a second cooking time modifier, wherein the first cooking time modifier and the second cooking time modifier are based at least in part on a cooking mode or operating characteristics of the first cooking chamber and the second cooking chamber, respectively; and multiplying the first cooking time by the first cooking time modifier and the second cooking time by the second cooking time modifier.

* * * * *